J. W. SHERMAN.
Grain Drill.
No. 6,853.  Patented Nov. 6, 1849.
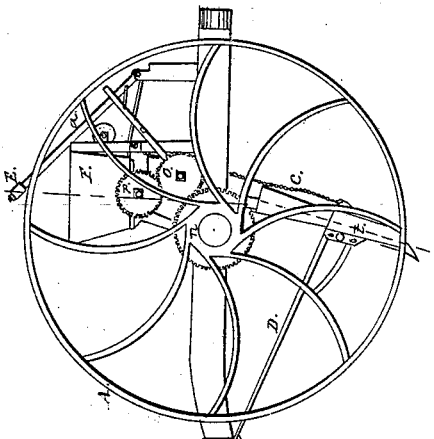
Fig. 2.
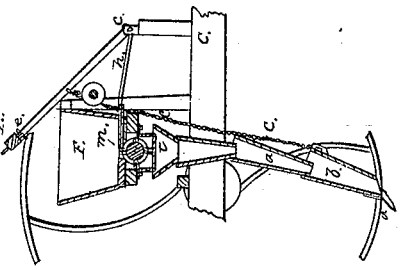
Fig. 3.
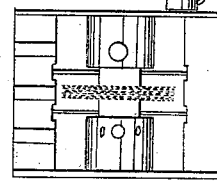
Fig. 10. Fig. 7.
Fig. 6.
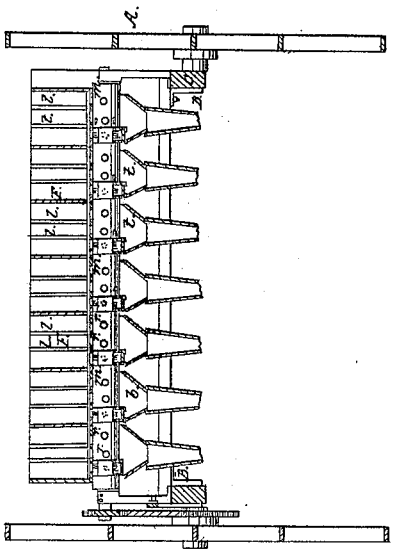
Fig. 4.
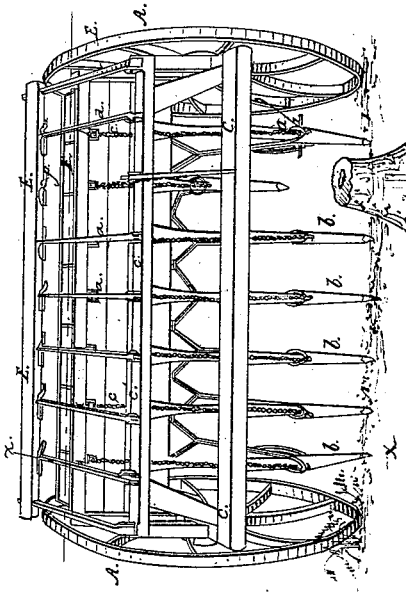
Fig. 1.
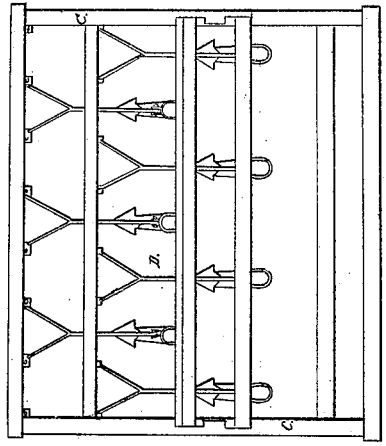
Fig. 5.

UNITED STATES PATENT OFFICE.

JNO. W. SHERMAN, OF ONTARIO, NEW YORK.

IMPROVEMENT IN SEED-PLANTERS.

Specification forming part of Letters Patent No. 6,853, dated November 6, 1849.

*To all whom it may concern:*

Be it known that I, JOHN W. SHERMAN, of Ontario, in the county of Wayne and State of New York, have invented certain new and useful improvements in machines for cultivating the soil, planting seed and roots, and spreading manure, of which the following is a full, clear, and exact description, reference being had to the annexed drawings of the same, making part of this specification, in which—

Figure 1 is a perspective elevation of the machine, viewed from behind, one of the teeth being raised to allow it to pass over a stump. Fig. 2 is an end elevation, showing the manner in which motion is conveyed from the driving-wheel to the distributer of the seed, &c. Fig. 3 is a vertical section through the line $x\,x$ of Fig. 1. Fig. 4 is a vertical transverse section taken through the hopper and parallel to the axle in the line 1 1 of Fig. 2. Fig. 5 is a view of the machine with every alternate tooth placed two feet behind the position they occupy for planting, it being in this case properly arranged for cultivating fallow land, and the hopper and sowing apparatus being removed. Fig. 6 is a top view of the hopper, having the brush-roller for planting seed in drills removed, and a fluted-roller for sowing broadcast inserted in its place. Fig. 7 is a view of the register-plate at the bottom of the hopper detached and shown upon a large scale. Fig. 10 is a view of the bottom of one of the compartments of the hopper, showing the feeding-cylinder, the register-plate being removed.

The same letters indicate the same parts in all the figures.

In the accompanying drawings, A A are wheels made in the manner of those of common carriages or otherwise. These wheels are connected by an axle, B, which bends upward at right angles at the inside of each wheel, in order that the space between them may be more elevated to allow the teeth to be raised sufficiently high to run clear of stumps or other obstructions. Upon this axle a rectangular frame, C, is placed, to the front end of which a tongue or shaft is secured to which the horses which draw the machine are harnessed. To the front transverse piece of the frame the beams B are hinged by their front end in such a manner as will allow them to play up and down freely. At the rear end of these beams the cultivator-teeth $a$ and seed-tubes $b$ are firmly fixed. Thus arranged each tooth is free to rise and fall with the surface of the ground in its own path and irrespective of the rest of the teeth, whereby the thorough and uniform cultivation of every part of the ground, whether elevated or depressed, is secured. The rear end of each hinged arm D is connected, by means of a chain, $c$, with one of the levers $d$, Fig. 3, which are hinged to the cross-bar $c'$. These levers are each provided with a catch, $e$, Fig. 3, upon their outer or loose end, which may be engaged to one of the spring-catches $f$ upon the transverse bar of the turning frame E, which last is also hinged to the cross-bar $c'$, so that when this frame E is turned up or down it may lower or raise all the teeth which are engaged by their catches, leaving down such as are not engaged. The height to which the teeth can be elevated above the ground will depend upon the height of the axle B and the distance from the joints of the levers $d$ at which the chains or cords $c$ are attached to them and the length of these chains for general purposes. If the teeth are elevated about eighteen inches, it will be found sufficient; but they may be raised more or less by adjusting the suspending-chains differently. The spring-catches of the turning frame E to hold the levers $d$ may be made in the manner represented or in any other way deemed to be more convenient or suitable. The levers $d$ can be adjusted singly by the hand of the attendant without in the least interrupting the progress of the rest. For instance, if a stone or low stump should happen to lie in the path of any of the teeth, and they were allowed to come into contact with it, they would in all probability be broken or damaged; but to prevent this, the attendant, seeing which tooth is likely to catch, by a single motion of the hand turns the proper lever $d$ and raises it above the obstruction, which being passed, another motion of the hand turns the lever back, and the tooth resumes its operation. To prevent a waste of seed while the action of the teeth is suspended, a register or cut-off, $g$, is placed in the bottom of the seed-box, which register is connected by the rod $h$ with the short arm of levers $d$ in such a way that when the levers hold the teeth above the ground the register will be pushed forward and close the apertures through which the seed is discharged, but when the teeth are lowered down again the register will be drawn back and the regular discharge of the seed resumed.

The teeth a of the cultivator are formed in any suitable manner and attached to the tubes b, through which the seed runs. If it is required to convert the apparatus into a wheel-cultivator, all that is required is to remove the hopper and seed-distributing apparatus, then unhinge every alternate tooth from the front transverse bar of the frame and hinge it to the second transverse bar, which is about fifteen inches (more or less) in rear of the first. This would be the proper arrangement of the teeth for cultivating fallow land. If the machine is required to be used as a leveler and weed-extirpator, the teeth are all arranged in a transverse row, and a bolt, i, put transversely through them in holes made for that purpose, the ends of the bolt being secured firmly to the frame by adjusting-hooks or other means, which will fix the teeth higher or lower, as it is desired to plow a deep or shallow furrow.

The apparatus for distributing seed or manure consists of a series of hoppers or receptacles, F, each receptacle being divided by the partition-plates l into three compartments, each of which may contain a different kind of seed; or the outside divisions may contain two different kinds of seed while the center division contains the manure, and by adjusting the registers g, so as to leave a greater or less space open for the seed to pass through, the several compartments can be made to discharge such relative quantities of seed and manure as may be desired. Immediately under the bottom of the seed-chests a revolving cylinder, m, Figs. 3 and 4, is placed. This cylinder turns upon suitable bearings, and is revolved by the motion communicated from the wheel A through the cog-wheels n o p, the wheel o being mounted upon a lever, q, which, when raised or lowered, engages or disengages the wheel o from the wheels p, by which means the motion of the cylinder can be arrested or continued at pleasure.

The lever q can be connected by a spring-catch or hook to the turning frame E, in order that when the latter is thrown forward to drop the teeth into the ground, the lever, with the wheel o, may be raised to connect the wheels n and p, and thereby put the cylinder in motion to discharge seed, and when the frame E is turned back, that the lever q may also be at the same time turned back to disconnect the wheels, thereby suspending the discharge of seed. If at any time it is required to suspend the discharge of seed while the teeth are in action, the operator can with his hand disconnect the lever q from turning frame E and throw the wheel o out of gear with the wheel p, which of course will cause the cylinder to stop.

The cylinder m is subdivided into a series of distinct parts, one for each tooth. Two adjacent portions of each part are of equal diameter and perforated with semi-globular cavities r of unequal size and at different distances apart, so that they may drop the seeds to be sown in such quantity and at such intervals as may be required. For instance, one end may discharge corn, the other pumpkin-seeds, a deposit of the pumpkin being made in every second, third, or fourth hill of corn, as may be preferable. The third portion of each subdivision of the cylinder is less in diameter than the rest, and is armed with a spiral row of bristles, s, for the purpose of discharging evenly and uniformly damp and fibrous seeds, manure, and other substances which it is almost impossible to discharge evenly by other means; or the two ends of each division may be used for discharging seeds, the brush occupying the central subdivision, as seen in Fig. 10. Beneath each subdivision of the cylinder m a wide funnel, t, is placed, which receives the seed or other substance discharged from all of the subdivisions of the cylinder, connected with a single tooth, and conducts it through the flexible tube u into the rigid tubes b, to which the teeth are attached.

What I claim as my invention, and desire to secure by Letters Patent, is—

1. The combination of the spring-catch f, with the levers d, substantially in the manner and for the purpose herein set forth.

2. The combination of the device (consisting of the rod h connected with the short arm of the lever d) for opening and closing the register g with the devices for gearing and ungearing the seed-roller and raising and depressing the drill-teeth, as described.

In testimony whereof I have hereunto signed my name in presence of two subscribing witnesses.

JOHN W. SHERMAN.

Witnesses:
  P. H. WATSON,
  S. W. WOOD.